US008985629B2

(12) United States Patent
Hattori

(10) Patent No.: US 8,985,629 B2
(45) Date of Patent: Mar. 24, 2015

(54) STEERING APPARATUS

(71) Applicant: NSK Ltd., Tokyo (JP)

(72) Inventor: Hiroyuki Hattori, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/239,804

(22) PCT Filed: Oct. 25, 2012

(86) PCT No.: PCT/JP2012/077585
§ 371 (c)(1),
(2) Date: Feb. 20, 2014

(87) PCT Pub. No.: WO2013/080718
PCT Pub. Date: Jun. 6, 2013

(65) Prior Publication Data
US 2014/0217713 A1    Aug. 7, 2014

(30) Foreign Application Priority Data

Dec. 2, 2011   (JP) .................................. 2011-264211

(51) Int. Cl.
*B62D 1/19*     (2006.01)
(52) U.S. Cl.
CPC ...................................... *B62D 1/195* (2013.01)
USPC .......................................... 280/777; 280/779
(58) Field of Classification Search
CPC .......... B62D 1/19; B62D 1/192; B62D 1/195; B62D 1/197; F16F 7/123
USPC .................... 280/777, 779, 780; 74/492, 493; 188/371, 374
See application file for complete search history.

(56) References Cited

U.S. PATENT DOCUMENTS 5,961,146 A * 10/1999 Matsumoto et al. .......... 280/777

FOREIGN PATENT DOCUMENTS

| JP | 9-272448 A | 10/1997 |
| JP | 2007-15670 A | 1/2007 |
| JP | 2007-223486 A | 9/2007 |
| JP | 2007-283826 A | 11/2007 |

(Continued)

OTHER PUBLICATIONS

International Search Report dated Jan. 29, 2013 issued in International Application No. PCT/JP2012/077585 (PCT/ISA/210).

(Continued)

*Primary Examiner* — Keith Frisby
(74) *Attorney, Agent, or Firm* — Sughrue Mion, PLLC

(57) ABSTRACT

A steering apparatus includes a steering shaft, a column rotatably supporting the steering shaft, a bracket attached to the column, a capsule configured to be fixed to a vehicle body and having upper and lower holding plates sandwiching the flange portion, a coupling part coupling the flange portion and the capsule such that the flange portion is detachable from the capsule by an impact force toward the front of the vehicle body, a rounded portion formed at a front end portion of the flange portion with a curvature radius varying along a vehicle-width direction, and an energy-absorbing member. The energy-absorbing member includes a rear portion engaged with the capsule, a front extension portion extending forward from the rear portion, a bent portion bent in front of the rounded portion, and a rear extension portion extending rearward and inclined in the vehicle-width direction with respect to the column center axis.

3 Claims, 7 Drawing Sheets

(56) References Cited

FOREIGN PATENT DOCUMENTS

JP 2008-222014 A 9/2008
JP 2008302752 A * 12/2008

OTHER PUBLICATIONS

Written Opinion dated Jan. 29, 2013 issued in International Application No. PCT/JP2012/077585 (PCT/ISA/237).

* cited by examiner

STEERING APPARATUS

TECHNICAL FIELD

The present invention relates to a steering apparatus, and particularly, to a steering apparatus having an impact-energy absorbing mechanism for lessening an impact force on a driver during secondary collision.

BACKGROUND ART

To reduce an impact force on a driver at the time of secondary collision, there is a steering apparatus having an impact-energy absorbing mechanism which is plastically deformed during a collapse movement of a column toward a front side of a vehicle body due to an impact force at the time of secondary collision, thereby reducing an impact load at the time of the secondary collision.

In such a steering apparatus, in order to achieve predetermined impact-energy absorbing characteristics, the impact-energy absorbing characteristics are changed during a collapse movement stroke. For example, a steering apparatus disclosed in Patent Document 1 includes two impact-energy absorbing members arranged to overlap each other in the vertical direction of a vehicle body such that positions of the impact-energy absorbing members are shifted in the front-rear direction of the vehicle body, thereby shifting the timings at which the respective impact-energy absorbing members start plastic deformation during the secondary collision, and changing the impact-energy absorbing characteristics during the collapse movement stroke.

However, since the steering apparatus of Patent Document 1 uses two impact-energy absorbing members, the manufacturing cost increases. Also, since the two impact-energy absorbing members are disposed to overlap each other in the vertical direction of the vehicle body such that the positions of the impact-energy absorbing members are shifted in the front-rear direction of the vehicle body, space for accommodating the impact-energy absorbing members increases in the vertical direction of the vehicle body and in the front-rear direction of the vehicle body. Therefore, the column becomes bulky and increases in weight.

PRIOR ART DOCUMENT

Patent Document

Patent Document 1: JP 2007-223486 A

DISCLOSURE OF INVENTION

Problem to be Solved by Invention

It is an object of the present invention to provide a steering apparatus having a simple and lightweight structure, and can change impact-energy absorbing characteristics during a collapse movement stroke at the time of secondary collision.

Means for Solving the Problem

According to an aspect of the present invention, a steering apparatus includes a steering shaft having a rear portion configured to allow a steering wheel to be mounted, a column supporting the steering shaft in a rotatable manner, a bracket attached to the column and including a flange portion, left and right capsules, each configured to be fixed to a vehicle body and including an upper holding plate and a lower holding plate for holding the flange portion therebetween, a coupling part coupling the flange portion and the capsules such that the flange portion is detachable from the capsules by an impact force toward a front side of the vehicle body, a rounded portion formed at a front end portion of the flange portion and having a curvature radius which varies along a vehicle width direction, and an energy absorbing member configured such that the energy absorbing member is plastically deformed by a pressure from the rounded portion moving along the energy absorbing member due to a forward movement of the flange portion. The energy absorbing member includes a rear portion engaged with the capsules, a front extension portion extending forward from the rear portion, a bent portion bent in front of the rounded portion, and a rear extension portion extending rearward such that the rear extension portion is inclined in the vehicle width direction with respect to a center axis of the column.

The energy absorbing member may be provided for each of the left and right capsules.

The energy absorbing member may be formed by bending a single wire. For example, the rear portion is engaged with a rear end face of the capsule, the front extension portion includes an inner front extension portion extending forward along an inner surface of the capsule in the vehicle width direction, and an outer front extension portion extending forward along an outer face of the capsule in the vehicle width direction, the bent portion includes an inner bent portion continuing from the inner front extension portion, and an outer bent portion continuing from the outer front extension portion, and the rear extension portion includes an inner rear extension portion continuing from the inner bent portion, and an outer rear extension portion continuing from the outer bent portion. The inner rear extension portion extends such that the inner rear extension portion is inclined outward in the vehicle width direction with respect to the center axis of the column, and the outer rear extension portion extends toward a rear side of the vehicle body such that the outer rear extension portion is inclined inward in the vehicle width direction with respect to the center axis of the column.

Advantage of Invention

According to an aspect of the present invention, the steering apparatus includes a rounded portion having a curvature radius which varies in the vehicle width direction, and the energy absorbing member is configured to be plastically deformed a pressure from the rounded portion moving along the energy absorbing member due to movement of the flange portion of the bracket toward the front side of the vehicle so as to absorb impact energy during a secondary collision.

By varying the curvature radius of the rounded portion in the vehicle width direction, the impact-energy absorbing characteristics can be changed during a collapse movement stroke at the time of secondary collision. Further, the energy absorbing member may be formed from a single wire, in which case a space for accommodating the energy absorbing member is saved in the vertical direction of the vehicle body and in the front-rear direction of the vehicle body, so that the column becomes lightweight. Furthermore, because the structure is simple, it is possible to suppress an increase in the manufacturing cost.

EMBODIMENTS OF INVENTION

Hereinafter, an embodiment of the present invention will be described with reference to the drawings. The following steering apparatus according to an embodiment is configured to be able to adjust both of the tilted position and telescopic position of a steering wheel.

Figure 1:
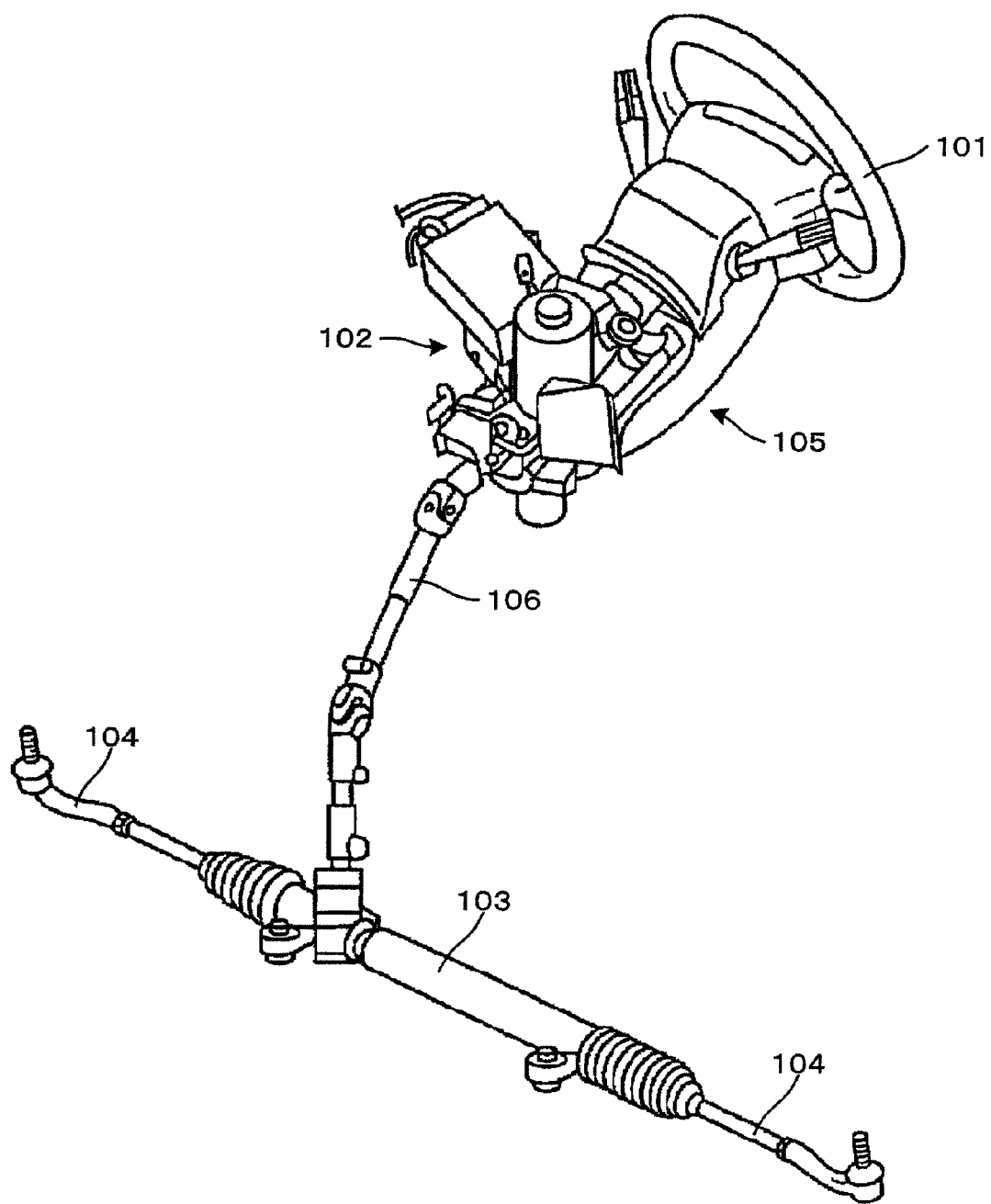
FIG. 1 is a perspective view of a steering apparatus according to an embodiment of the present invention.

As shown in FIG. 1, the steering wheel according to the embodiment is a rack-and-pinion type power steering apparatus of a column assist type. In other words, in the power steering apparatus, in order to reduce the steering force of a steering wheel 101, an electric assistance mechanism 102 is attached to a column 105. The steering assistance force of the electric assistance mechanism 102 is applied to a steering shaft, and makes a rack of a steering gear 103 to reciprocate, through an intermediate shaft 106, thereby steering wheels through tie rods 104.

FIGS. 2 to 7 show a structure around the column 105 of the steering apparatus of FIG. 1. In the following description, a "front side" and a "rear side" are based on the front-rear direction of a vehicle body to which the steering apparatus is attached.

Figure 2:
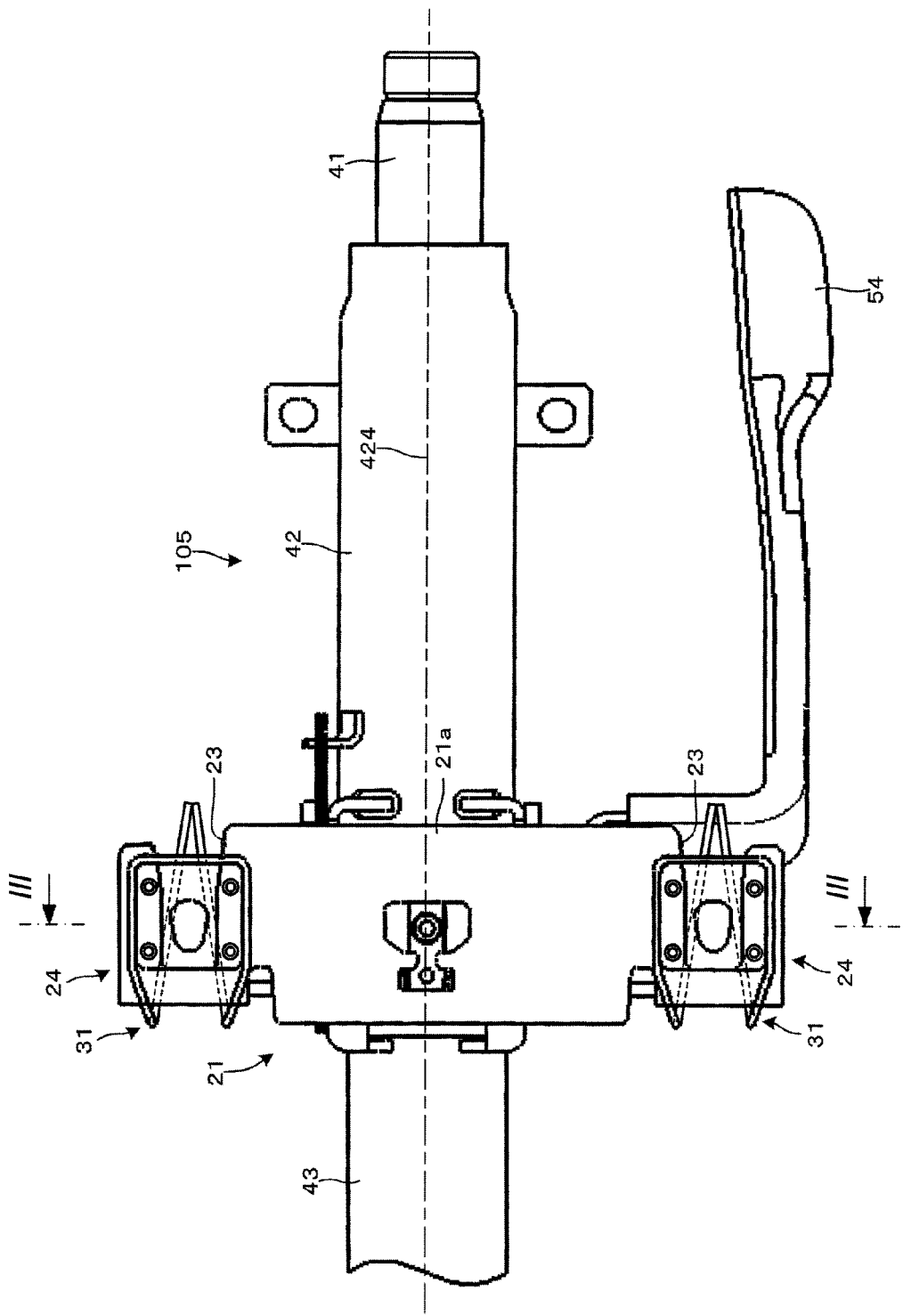
FIG. 2 is a plan view of a portion of the steering apparatus of FIG. 1.

As shown in FIGS. 2 to 7, the column 105 includes a cylindrical outer column 42, and an inner column 43 provided at the front portion of the outer column 42 (the left side of FIG. 2). A steering shaft 41 has a rear portion configured to allow the steering wheel 101 to be attached, and is rotatably supported by the outer column 42. The outer column 42 is guided to long grooves 26, 26 for tilt adjustment (see FIG. 3) provided at an upper vehicle body mounting bracket 21 (hereinafter, referred to as a bracket), and can adjust a tilt. The long grooves 26, 26 for tilt adjustment are formed in side plates 21b, 21b of the bracket 21.

Into the front portion of the outer column 42, the inner column 43 is fit to be capable of telescopic movement in an axial direction. To the front portion of the inner column 43, the electric assistance mechanism 102 (see FIG. 1) is attached. The electric assistance mechanism 102 is pivotably supported by a lower vehicle body mounting bracket fixed to a vehicle body 1 (see FIG. 3) such that the electric assistance mechanism 102 is tiltable with respect to a tilt center shaft.

At the lower wall of the outer column 42, a slit 422 is formed to penetrate to the inner circumferential surface 421 (see FIG. 3) of the outer column 42. Further, the outer column 42 has long grooves 423, 423 for telescopic adjustment formed such that their long axis directions extend in parallel with the axis of the outer column 42 (a direction perpendicular to the drawing sheet of FIG. 3).

Figure 3:
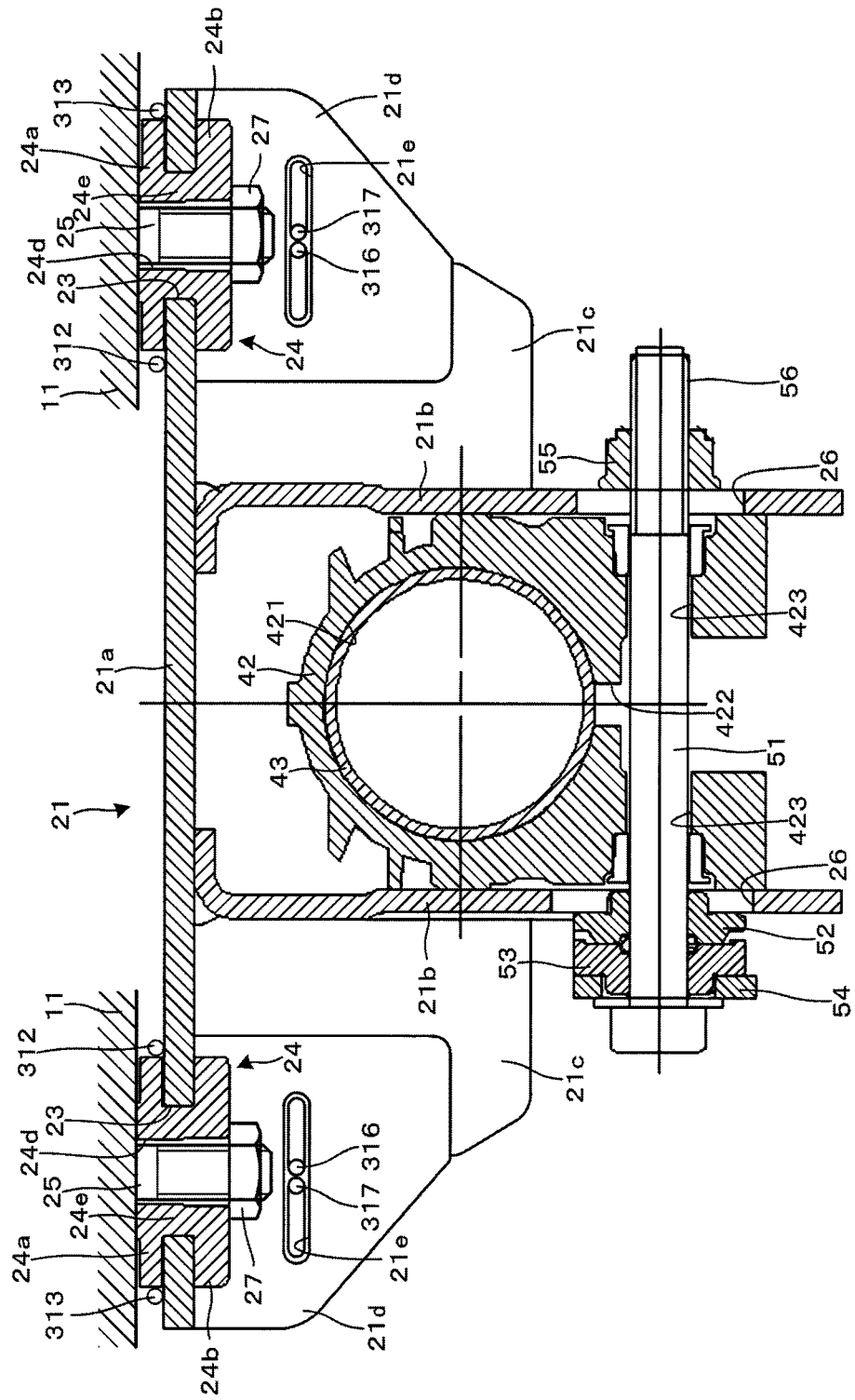
FIG. 3 is a cross-sectional view taken along a line III-III of FIG. 2.

Into the long grooves 26, 26 for tilt adjustment and the long grooves 423, 423 for telescopic adjustment, a tightening rod 51 is inserted from the left side in FIG. 3. Onto the outer circumference of the left end portion (left end portion in FIG. 3) of the tightening rod 51, a fixed cam 53, a movable cam 53, and an operating lever 54 are sequentially fit. Onto the right end potion (right end potion in FIG. 3) of the tightening rod 51, an adjustment nut 55 is fit. Internal thread formed on the inner circumferential portion of the adjustment nut 55 is threaded to external thread formed at the right end potion of the tightening rod 51 such that the left end surface of the adjustment nut 55 abuts on the outer surface of the right side plate 21b.

The operating lever 54 is fixed to the left end surface of the movable cam 53. The movable cam 53 is integrally operated by the operating lever 54, and the movable cam 53 and the fixed cam 53 form a cam locking mechanism.

By rotating the operating lever 54, the bracket 21 clamps the side surfaces of the outer column 42. The tilted position of the outer column 42 is adjusted when the outer column 42 is undamped. Also, when the outer column 42 is clamped, the inner circumferential surface 421 of the outer column 42 decreases in diameter such that the outer column 42 clamps the outer circumferential surface of the inner column 43. The telescopic position of the outer column 42 is adjusted when the inner column 43 is unclamped.

The bracket 21 is fixed to the vehicle body 1. On the side plates 21b, 21b of the bracket 21, a flange portion 21a is provided. A mounting structure of the vehicle body 1 and the bracket 21 is configured to include left and right cut grooves 23, 23 (see FIGS. 2 and 3) formed at the flange portion 21a, and left and right capsules 24, 24 fit into side edge portions of the cut grooves 23, 23 and be symmetrical with respect to the axis of the outer column 42 in the vehicle width direction (the left/right direction of FIG. 3).

The bracket 21 and the outer column 42 are formed with conductive materials such as metals. The cut grooves 23, 23 are open on the rear side of the flange portion 21a. Into the cut grooves 23, 23, the capsules 24, 24 formed with conductive materials such as metals (for example, aluminum, light alloys such as zinc alloy die-casting) are fit. Each of the capsules 24, 24 is coupled with the flange portion 21a by four shear pins 24c (examples of coupling parts). The capsules 24, 24 are fixed to the vehicle body 1 by bolts 25 inserted in a long-groove-like bolt holes 24d formed in the capsules 24, and nuts 27 (see FIG. 3).

As shown in FIGS. 2 to 5, the capsules 24 include upper holding plates 24a and lower holding plates 24b. The flange portion 21a is inserted between the upper holding plates 24a and the lower holding plates 24b such that the upper holding plates 24a and the lower holding plates 24b holds the side edge portions of the cut grooves 23.

The capsules 24 include connecting portions 24e connecting the upper holding plates 24a and the lower holding plates 24b. Side surfaces of each of the connecting portions 24e in the vehicle width direction are held between side surfaces of corresponding cut grooves 23 in the vehicle width direction. The sizes of the connecting portions 24e in the vehicle width direction are smaller than the sizes of the upper holding plates 24a and the lower holding plates 24b in the vehicle width direction. Both side surfaces of each connecting portion 24e are formed by inclined surfaces such that the width of the front side (the left side in FIG. 4) of the corresponding connecting portion 24e is the smallest, and the width of the corresponding connecting portion 24e gradually widens toward the rear side (the right side in FIG. 4) of the corresponding connecting portion 24e.

The cut grooves 23 of the flange portion 21a are formed along the inclined surfaces of the connecting portions 24e. Therefore, during collapse movement of the bracket 21, the bracket 21 is detached from the connecting portions 24e, 24e and moves toward the front side of the vehicle body.

At the center portion of the front end (the left side in FIG. 2) of the flange portion 21a in the vehicle width direction, bent portions 21c, 21c (see FIG. 3) are formed to be bent in L shapes downward from the front end of the flange portion 21a. Also, even at the left and right end portions of the front end of the flange portion 21a in the vehicle width direction, on the front sides of the cut grooves 23, 23, bent portions 21d, 21d (see FIG. 3) are formed to be bent in L shapes downward from the front end of the flange portion 21a.

Figure 4:
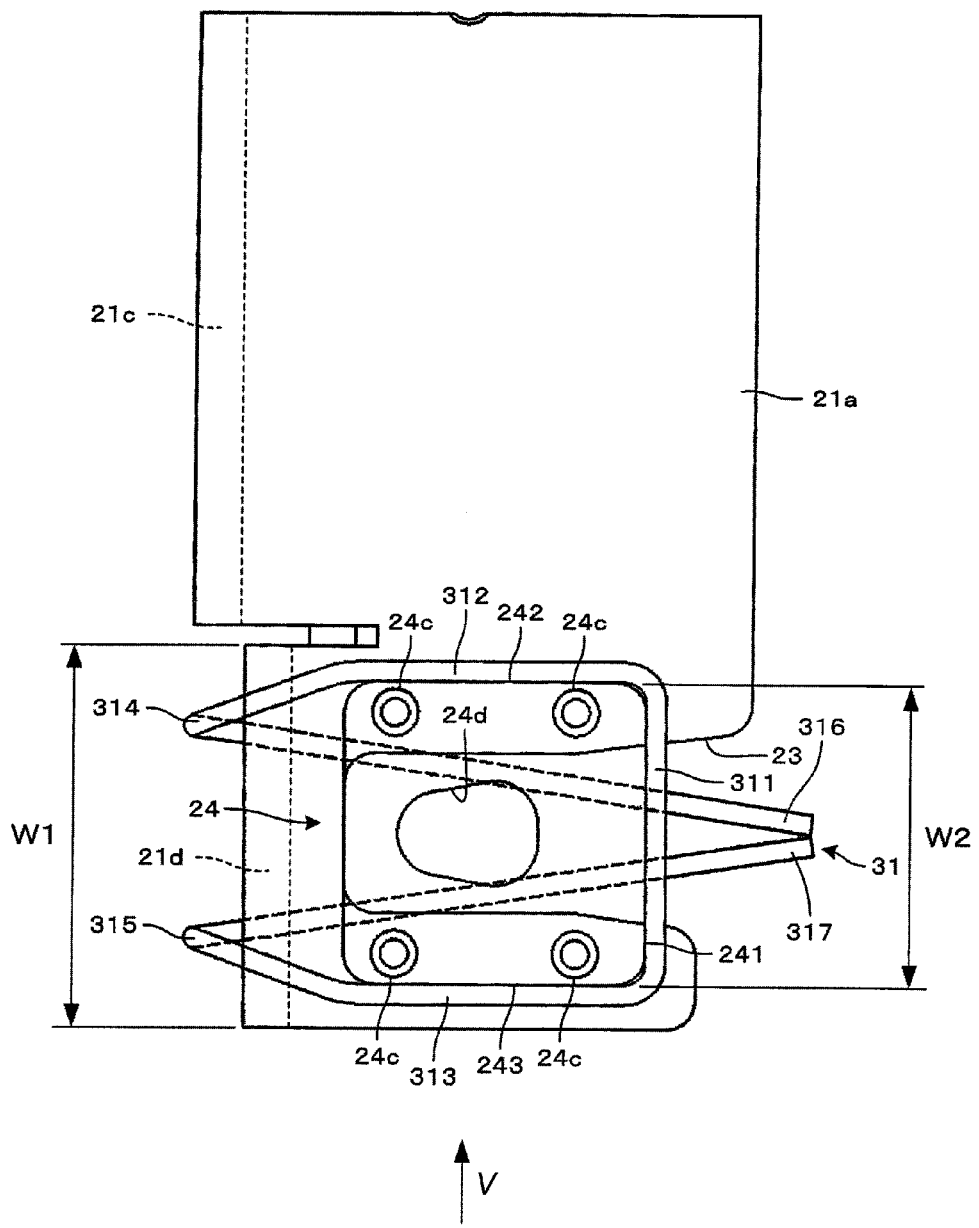
FIG. 4 is a plan view illustrating a structure around an energy absorbing member which is engaged with one capsule of left and right capsules shown in FIG. 2.

The bent portions 21d, 21d and the bent portions 21c, 21c enhance the rigidity of the bracket 21. The bent portions 21d, 21d of the left and right end portions are formed toward the rear surface (the right side in FIG. 2) from the bent portions 21c, 21c of the center portion. Also, as shown in FIG. 4, the widths W1 of the bent portions 21d in the vehicle width direction are slightly larger than the widths W2 of the capsules 24 in the vehicle width direction.

Figure 5:
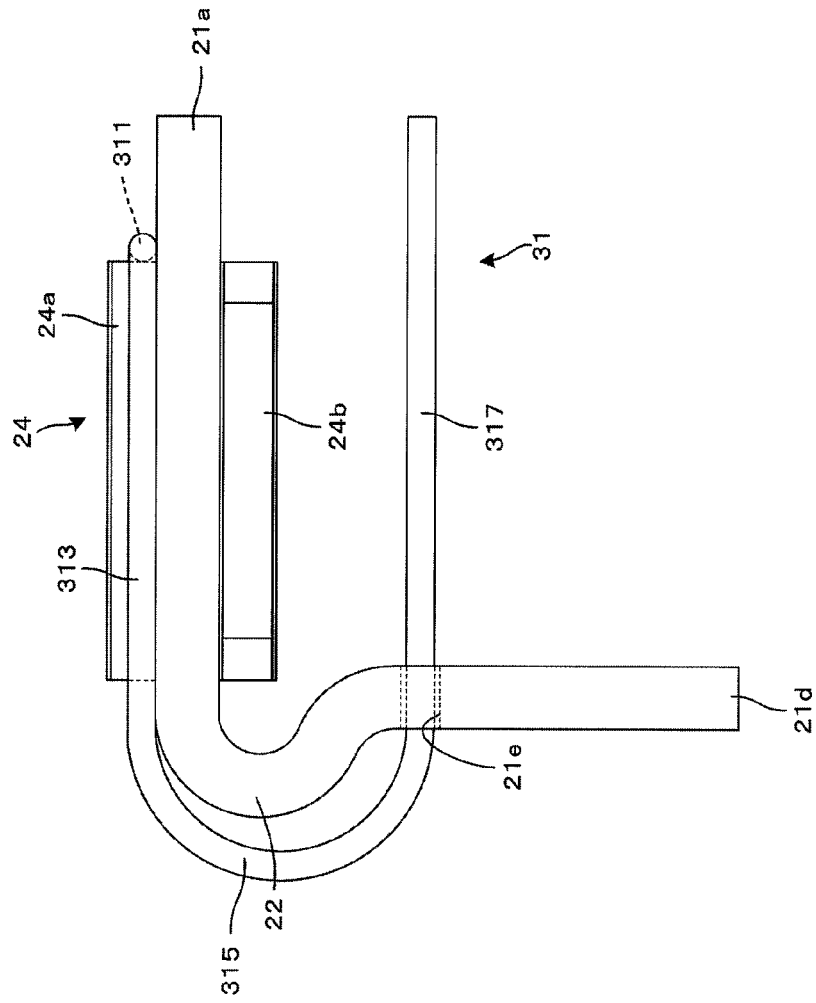
FIG. 5 is a side view as seen in a direction indicated by an arrow V in FIG. 4.
Figure 6A:
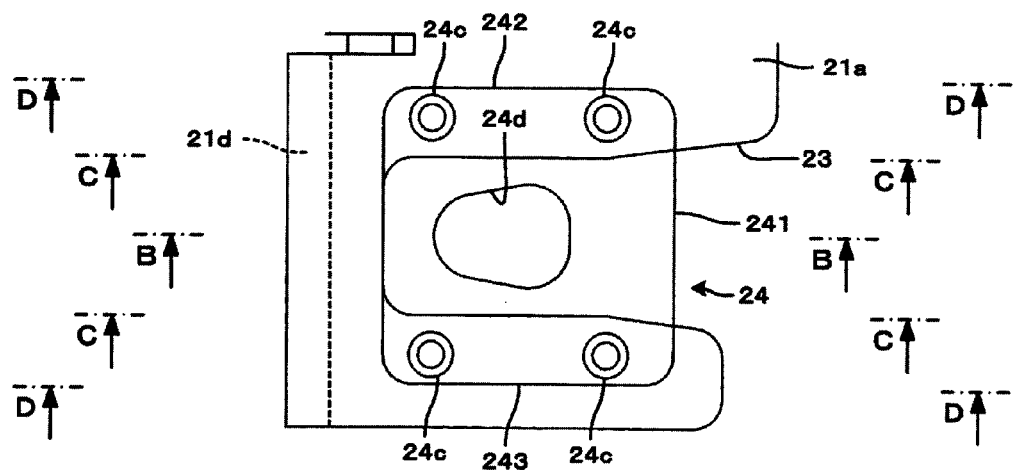
FIG. 6A is a plan view illustrating a state before the energy absorbing member is assembled with the capsule of FIG. 4.
Figure 6B:
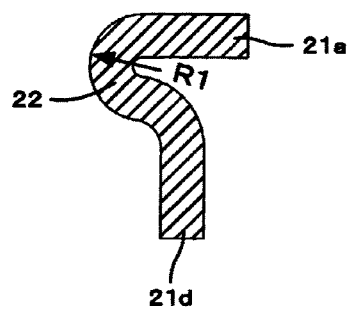
FIG. 6B is a cross-sectional view taken along a line B-B of FIG. 6A.
Figure 6C:
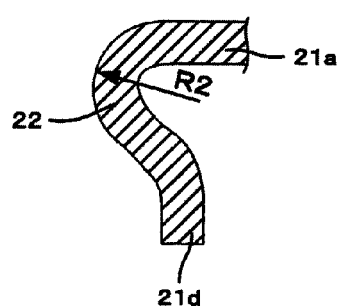
FIG. 6C is a cross-sectional view taken along a line C-C of FIG. 6A.
Figure 6D:
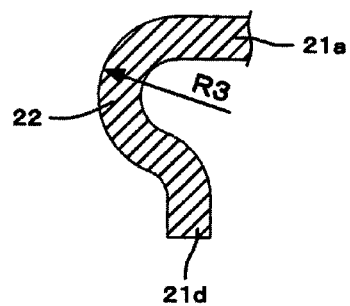
FIG. 6D is a cross-sectional view taken along a line D-D of FIG. 6A.

As shown in FIGS. 5 to 6D, in the bent portions 21d, 21d of the left and right ends, at the connection portions of the flange portions 21a, 21a and the bent portions 21d, 21d, rounded portions 22 are formed. The rounded portions 22 are formed such that the curvature radiuses of the rounded portions 22 gradually increase from the center portions of the bent portions 21d toward both ends in the vehicle width direction.

In other words, as shown in FIG. 6B, the rounded portions 22 are formed such that the curvature radiuses R1 of the rounded portions 22 of the center portions of the bent portions 21d in the vehicle width direction are the smallest. As shown in FIG. 6C, the curvature radiuses R2 of the rounded portions 22 of places slightly apart from the center portions toward both ends in the vehicle width direction are slightly larger than the curvature radiuses R1 of the rounded portions 22 of the center portions. As shown in FIG. 6D, the curvature radiuses R3 of the rounded portions 22 of two places furthest from the center portions toward both ends in the vehicle width direction are the largest. In other words, the rounded portions 22 are formed such that the curvature radiuses of the rounded portions 22 gradually decrease from both ends of the bent portions 21d toward the center portions in the vehicle width direction.

Energy absorbing members 31, 31 are attached between the capsules 24, 24 and the bent portions 21d, 21d. Each energy absorbing member 31 includes a rear portion 311, front extension portions 312, 313, bent portions 314, 315, and rear extension portions 316, 317. The rear portion 311 of the energy absorbing member 31 is engaged with the rear end face 241 of the upper holding plate 24a of a corresponding capsule 24. The energy absorbing member 31 is formed by bending a single wire.

The front extension portions 312, 313 are formed by bending both ends of the rear portion 311 of the wire at in the vehicle width direction toward the front side about at a right angle. The front extension portion 312 (an inner front extension portion) on the inner side in the vehicle width direction extends forward along the inner face 242 of the capsule 24 in the vehicle width direction. The wire is bent downward from the front end portion of the inner front extension portion 312, such that the bent portion 314 (an inner bent portion) is formed at the front side of the rounded portion 22 and the rear extension portion 316 (an inner rear extension portion) is formed to extend rearward from the bent portion 314. The inner rear extension portion 316 is formed to be inclined outward with respect to the center axis 424 (see FIG. 2) of the outer column 42 in the vehicle width direction.

Similarly, the front extension portion 313 (an outer front extension portion) on the outer side in the vehicle width direction extends forward along the outer face 243 of the capsule 24 in the vehicle width direction. The wire is bent downward from the front end portion of the outer front extension portion 313, such that the bent portion 315 (an outer bent portion) is formed at the front side of the rounded portion 22 and the rear extension portion 317 (an outer rear extension portion) is formed to extend rearward from the bent portion 315. The inner rear extension portion 317 is formed to be inclined inward with respect to the center axis 424 (see FIG. 2) of the outer column 42 in the vehicle width direction.

The rear extension portions 316, 317 extend toward the rear side of the vehicle body through holes 21e (see FIGS. 3 and 5) formed in the bent portions 21d. During secondary collision, when the flange portions 21a, 21a move toward the front side of the vehicle body, the holes 21e guide the rear extension portions 316, 317 whereby the rear extension portions 316, 317 are plastically deformed by being smoothly pressed by the rounded portions 22 moving along the rear extension portions 316, 317, thereby absorbing impact energy during the secondary collision.

When a driver collides with the steering wheel 101 due to an impact during secondary collision and thus a strong impact force is applied toward the front side of the vehicle body, the bracket 21 carries outs collapse movement toward the front side of the vehicle body, and the shear pins 24c shear. When the shear pins 24c shear, the capsules 24 remain on a side of the vehicle body 1, and the flange portion 21a of the bracket 21 carries out collapse movement toward the front side of the vehicle body.

Figure 7:
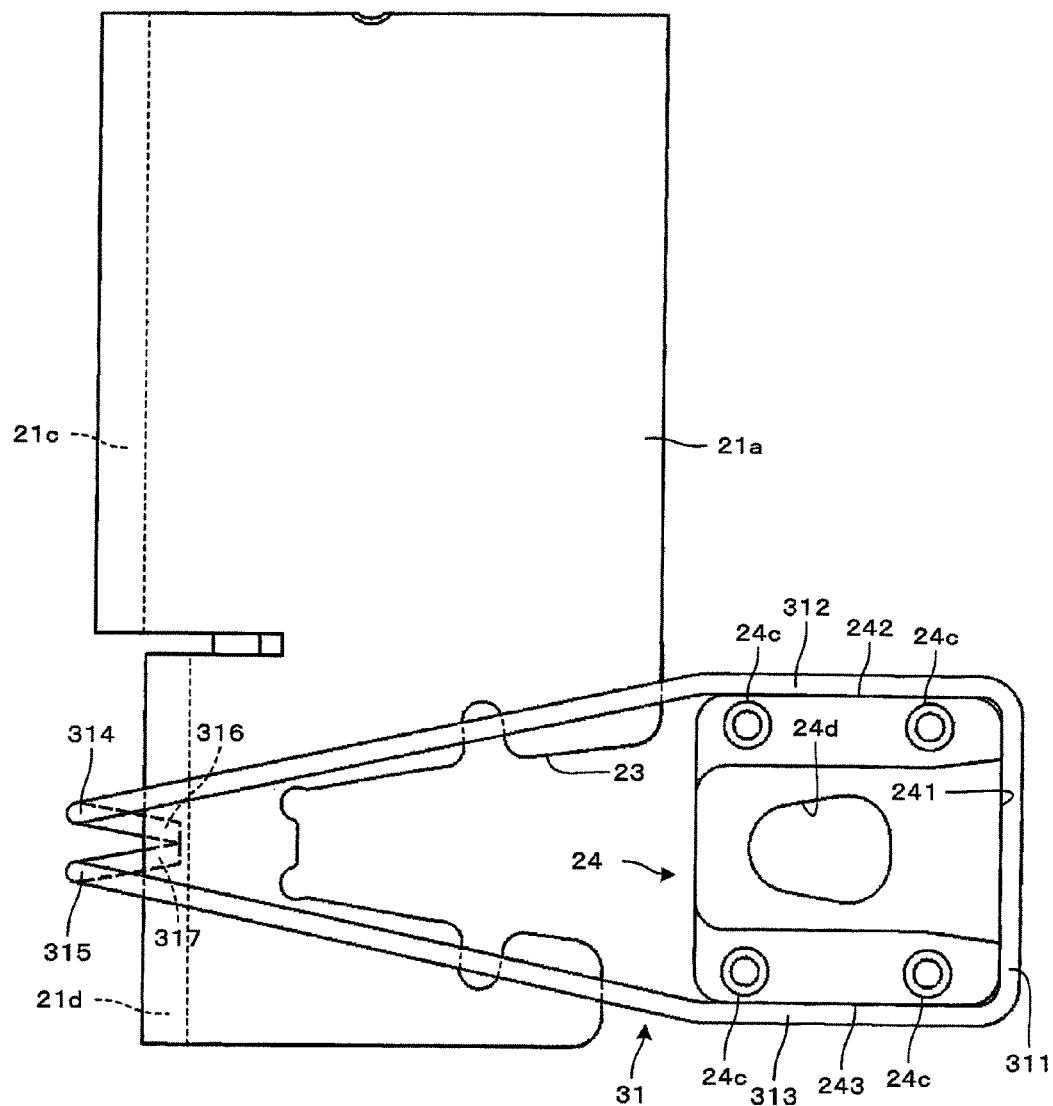
FIG. 7 is a plan view illustrating a state in which a column has carried out collapse movement to a collapse movement end on the front side of a vehicle body.

Then, as shown in FIG. 7, the rear extension portions 316, 317 of the energy absorbing member 31 are plastically deformed by a pressure from the rounded portions 22 of the bent portions 21d moving along the rear extension portions 316, 317, thereby absorbing impact energy during secondary collision. The curvature radius of the rounded portion 22 is formed to gradually decrease from respective ends toward the center portion of the bent portions 21d in the vehicle width direction. The rear extension portion 316 is inclined outward with respect to the center axis 424 of the outer column 42 in the vehicle width direction, and extends toward the rear side of the vehicle body. The rear extension portion 317 is inclined inward in the vehicle width direction with respect to the center axis 424 of the outer column 42, and extends toward the rear side of the vehicle body.

Therefore, during the progress of the collapse movement of the flange portion 21a toward the front side of the vehicle body, the locations where the rear extension portions 316, 317 are pressed by the rounded portion 22 moving along the rear extension portions 316, 317 gradually move from respective ends toward the center portion of each of the bent portions 21d, 21d in the vehicle width direction. Because the curvature radius of the rounded portion 22 is formed to gradually decrease from respective ends toward the center portion of each of the bent portions 21d, 21d in the vehicle width direction, energy for plastically deforming and bending the rear extension portions 316, 317 gradually increases.

In other words, by varying the curvature radius of the rounded portion 22 of each of the bent portions 21d, 21d along the vehicle width direction, impact-energy absorbing characteristics can be changed during a collapse movement stroke at the time of secondary collision. Further, since the energy absorbing member 31 is formed by bending a single wire, a space for accommodating the energy absorbing member 31 is saved in the vertical direction of the vehicle body and the front-rear direction of the vehicle body, and the column become lightweight. Furthermore, since the structure is simple, it is possible to suppress an increase in the manufacturing cost.

In the above-described embodiment, the rounded portions 22 are provided as parts of the bracket 21. However, the rounded portions may be separately made of resins, metals, or the like to be attachable to the bracket 21. In the above-described embodiment, the shear pins are used as the coupling parts for connecting the flange portion to the capsules such that the flange portion is detachable from the capsules by a predetermined impact force toward the front side of the vehicle body. Instead of the shear pins, the capsules and the flange portion may be coupled by press fitting, such that the fit portions of the flange portion can be detached from the capsules and the flange portion can carry out collapse movement toward the front side of the vehicle body. Also, although an example in which the present invention was applied to a steering apparatus in which a tilted position and a telescopic position are adjustable has been described in the above-described embodiment, the present invention may be applied to telescopic type steering apparatuses in which only telescopic positions are adjustable, and steering apparatuses in which any of tilted positions and telescopic positions are not adjustable.

This application is based on Japanese Patent Application No. 2011-264211 filed on Nov. 2, 2011, the content of which is incorporated herein by reference.

INDUSTRIAL APPLICABILITY

The present invention is applicable to steering apparatuses.

DESCRIPTION OF REFERENCE NUMERALS AND SIGNS

101 Steering Wheel
105 Column
1 Vehicle Body
21 Upper Vehicle Body Mounting Bracket (Bracket)
21B Side Plate
21D Bent Portion
22 Rounded Portion
24 Capsule
24A Upper Holding plate
24B Lower Holding Plate
24C Shear Pin (Coupling Part)
241 Rear End Surface
242 Inner Surface
243 Outer Surface
31 Energy Absorbing Member
311 Rear Portion
312, 314 Front Extension Portion
314, 315 Bent Portion
316, 317 Rear Extension Portion
41 Steering Shaft
42 Outer Column
424 Central Axis Line
43 Inner Column

The invention claimed is:

1. A steering apparatus comprising:
a steering shaft having a rear portion configured to allow a steering wheel to be mounted;
a column supporting the steering shaft in a rotatable manner;
a bracket attached to the column and including a flange portion;
left and right capsules, each configured to be fixed to a vehicle body and including an upper holding plate and a lower holding plate for holding the flange portion therebetween;
a coupling part coupling the flange portion and the capsules such that the flange portion is detachable from the capsules by an impact force toward a front side of the vehicle body;
a rounded portion formed at a front end portion of the flange portion and having a curvature radius which varies along a vehicle width direction; and
an energy absorbing member including a rear portion engaged with the capsules, a front extension portion extending forward from the rear portion, a bent portion bent in front of the rounded portion, and a rear extension portion extending rearward such that the rear extension portion is inclined in the vehicle width direction with respect to a center axis of the column, wherein the energy absorbing member is configured such that the energy absorbing member is plastically deformed by a pressure from the rounded portion moving along the energy absorbing member due to a forward movement of the flange portion.

2. The steering apparatus according to claim 1, wherein the energy absorbing member is provided for each of the left and right capsules.

3. The steering apparatus according to claim 2, wherein the energy absorbing member is formed by bending a single wire,
wherein the rear portion is engaged with a rear end face of the capsule,
wherein the front extension portion includes an inner front extension portion extending forward along an inner surface of the capsule in the vehicle width direction, and an outer front extension portion extending forward along an outer face of the capsule in the vehicle width direction,
wherein the bent portion includes an inner bent portion continuing from the inner front extension portion, and an outer bent portion continuing from the outer front extension portion,
wherein the rear extension portion includes an inner rear extension portion continuing from the inner bent portion, and an outer rear extension portion continuing from the outer bent portion,
wherein the inner rear extension portion extends such that the inner rear extension portion is inclined outward in the vehicle width direction with respect to the center axis of the column, and
wherein the outer rear extension portion extends toward a rear side of the vehicle body such that the outer rear extension portion is inclined inward in the vehicle width direction with respect to the center axis of the column.

* * * * *